June 16, 1942.  V. E. ANDREWS ET AL  2,286,945
WELDING MACHINE
Filed March 4, 1941  9 Sheets-Sheet 8
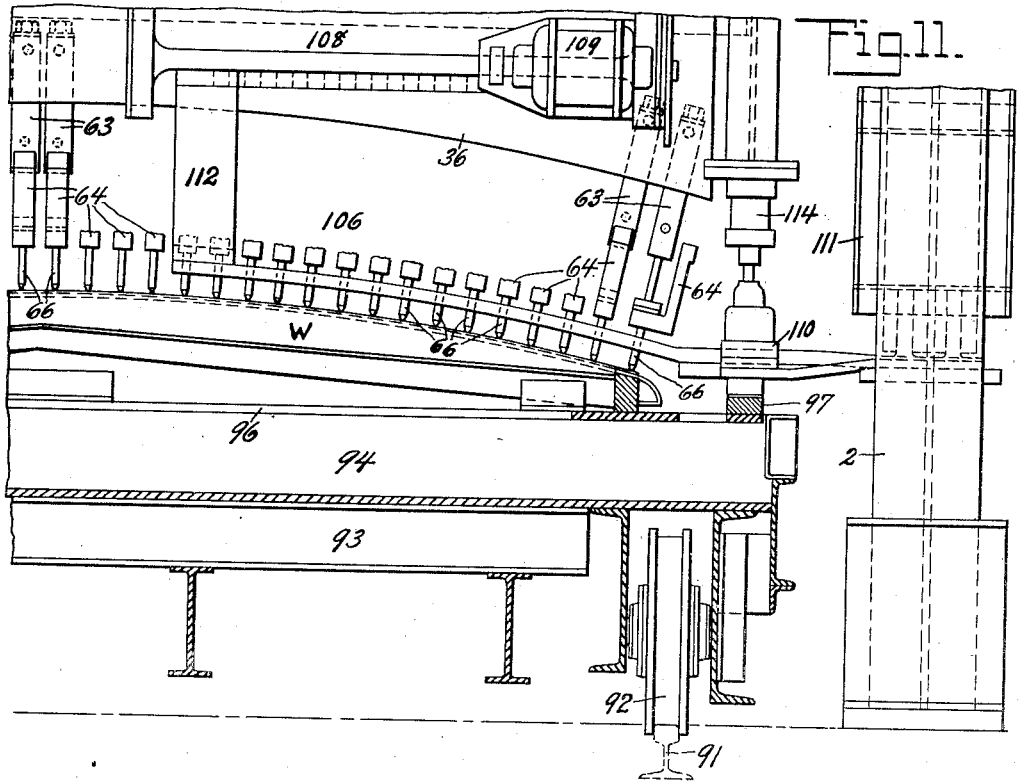
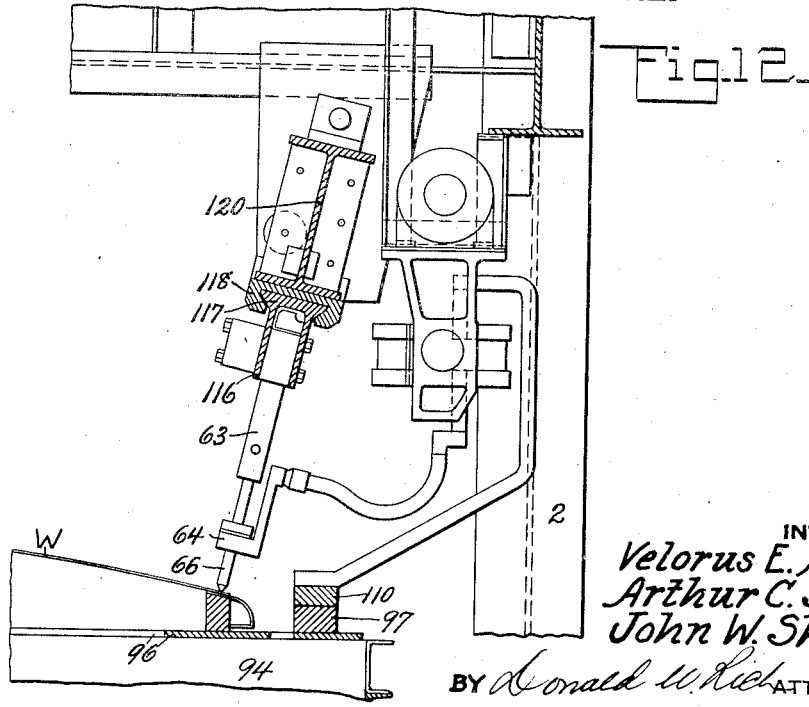
INVENTORS
Velorus E. Andrews
Arthur C. Schanz
John W. Sheffer
BY Donald W. Rich ATTORNEY

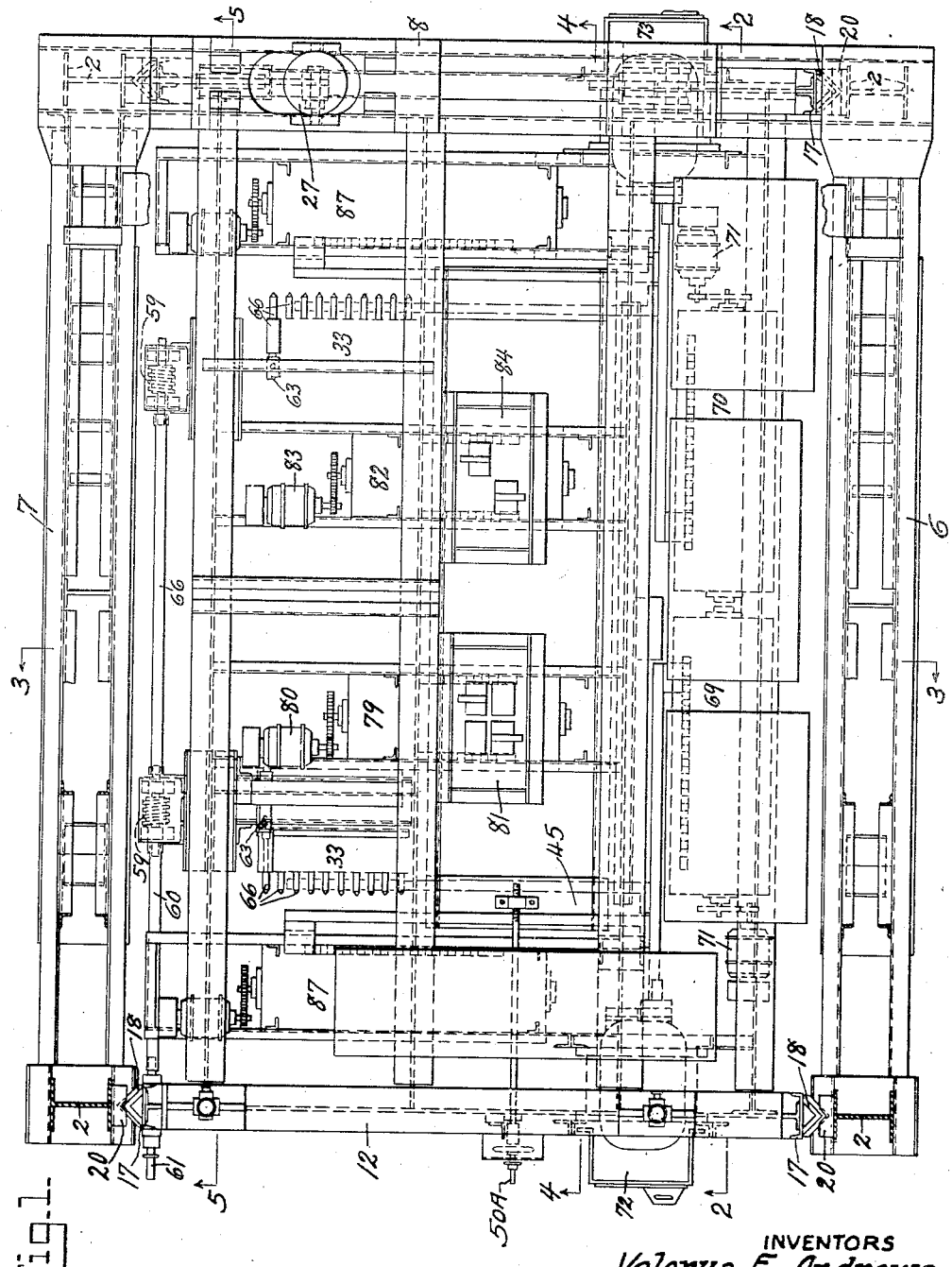

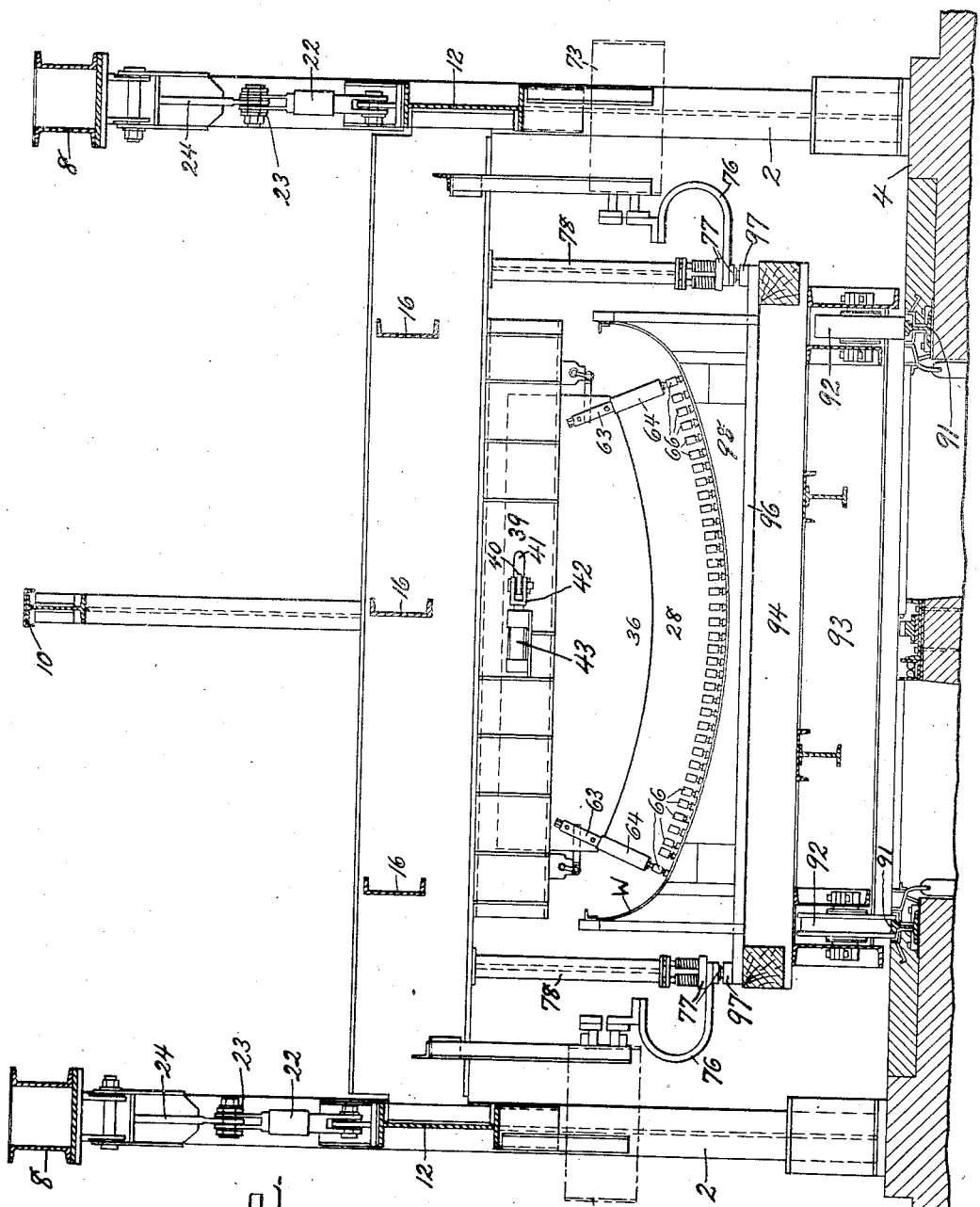

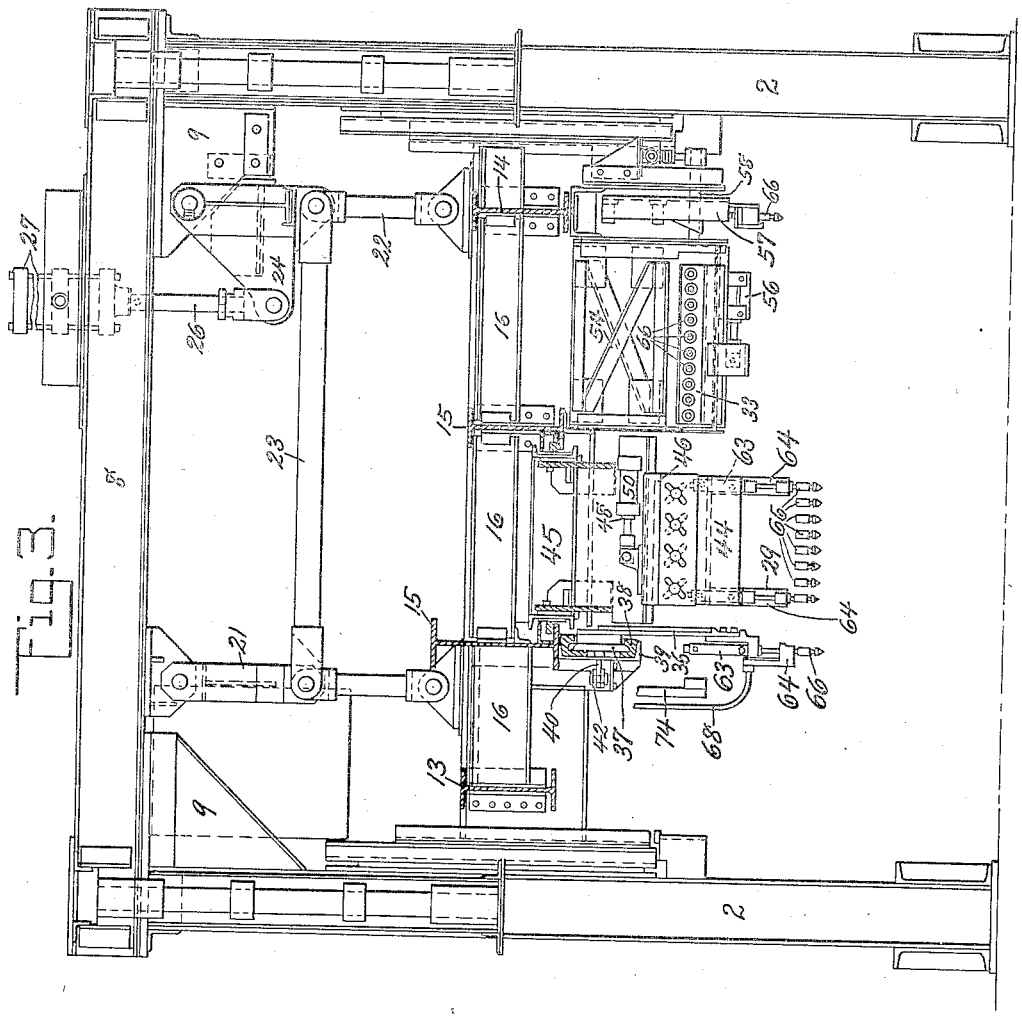

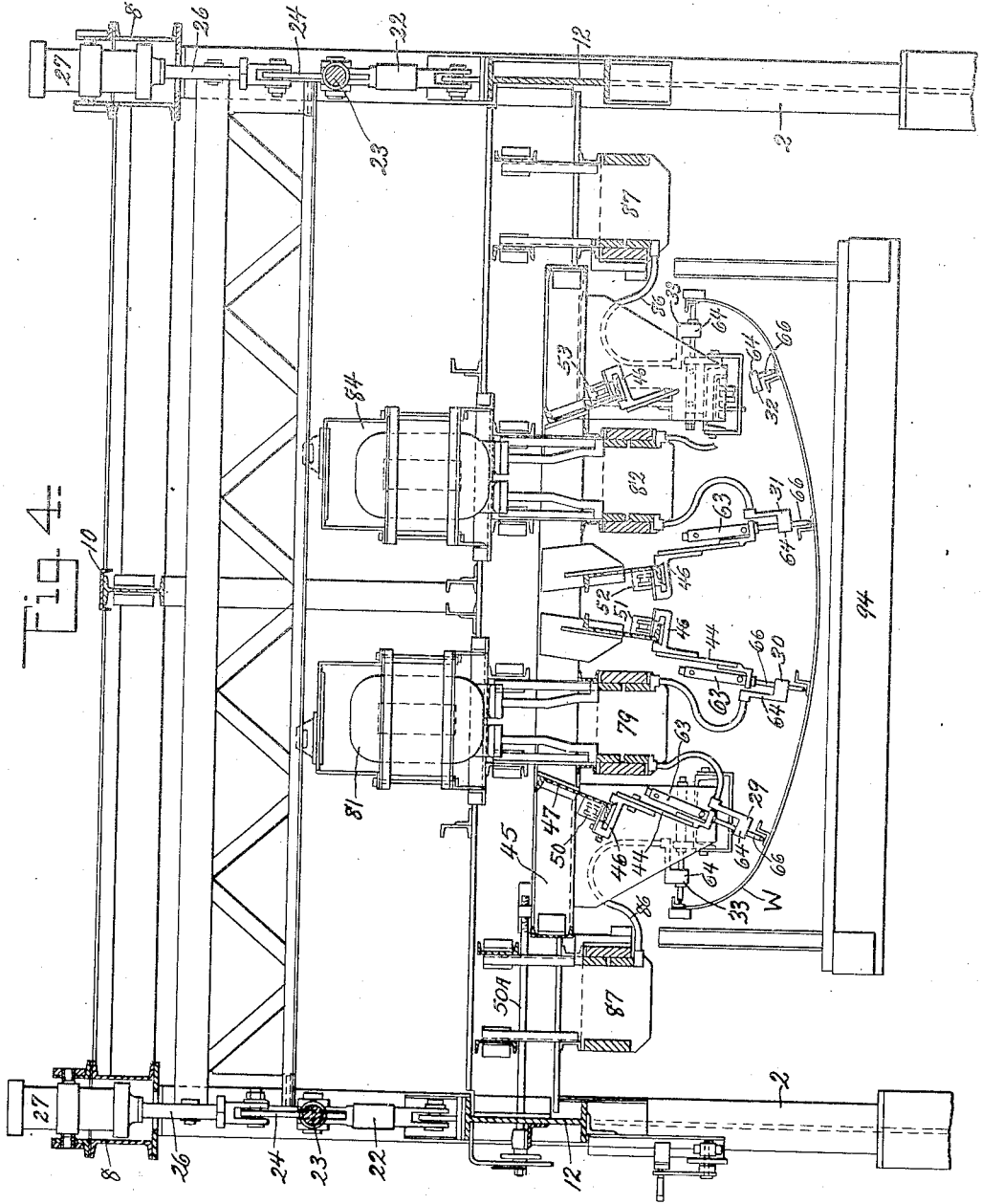

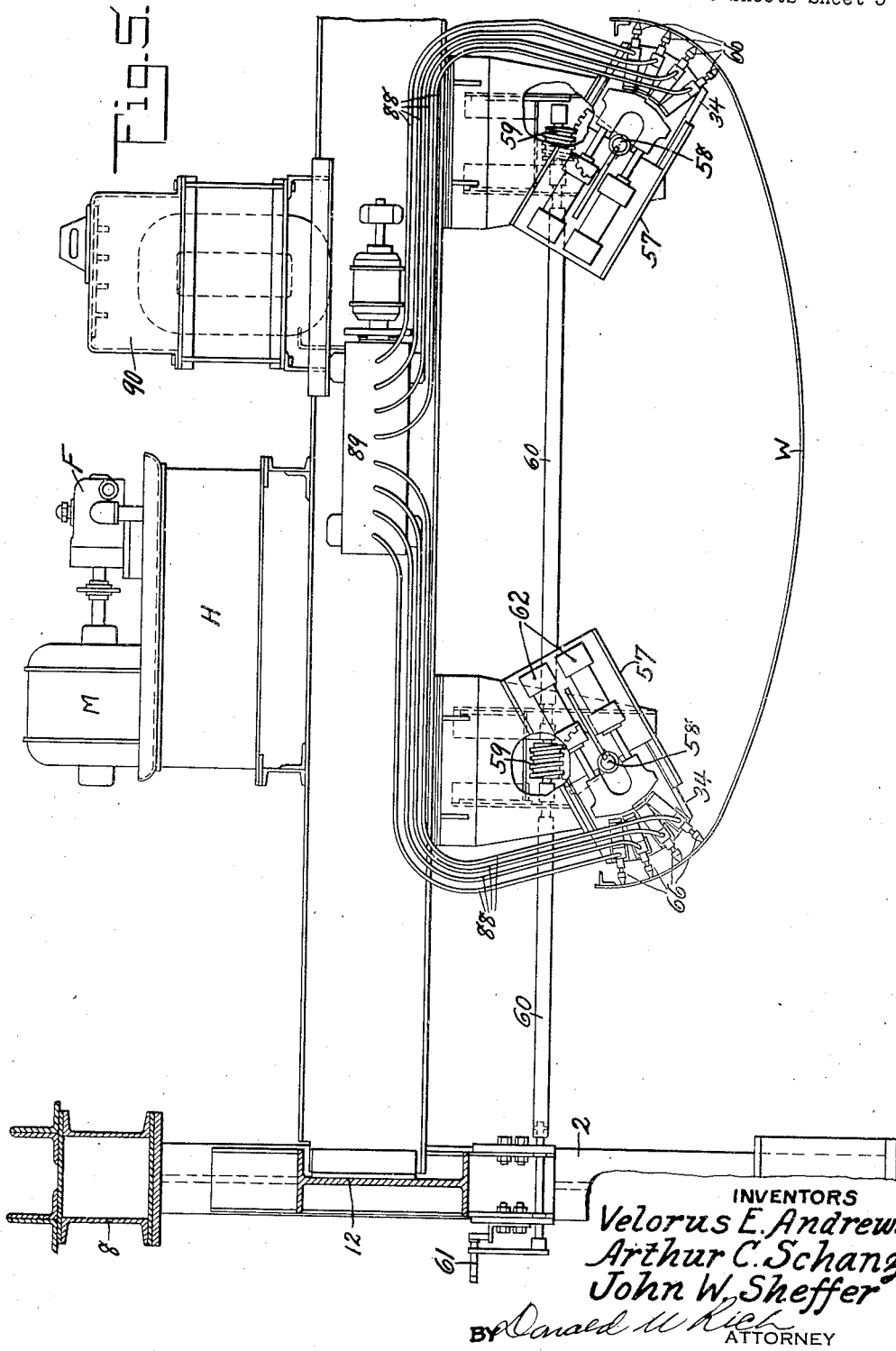

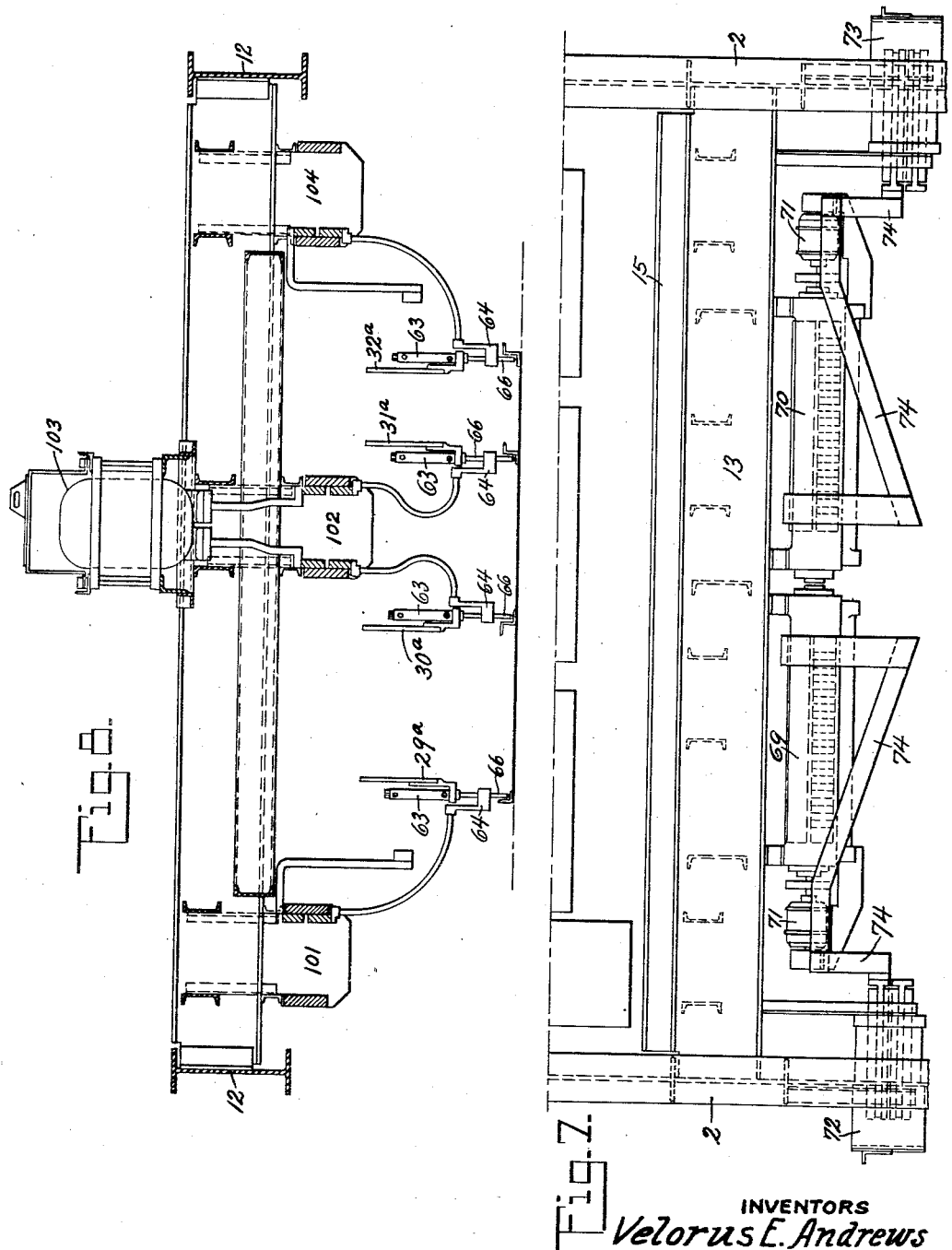

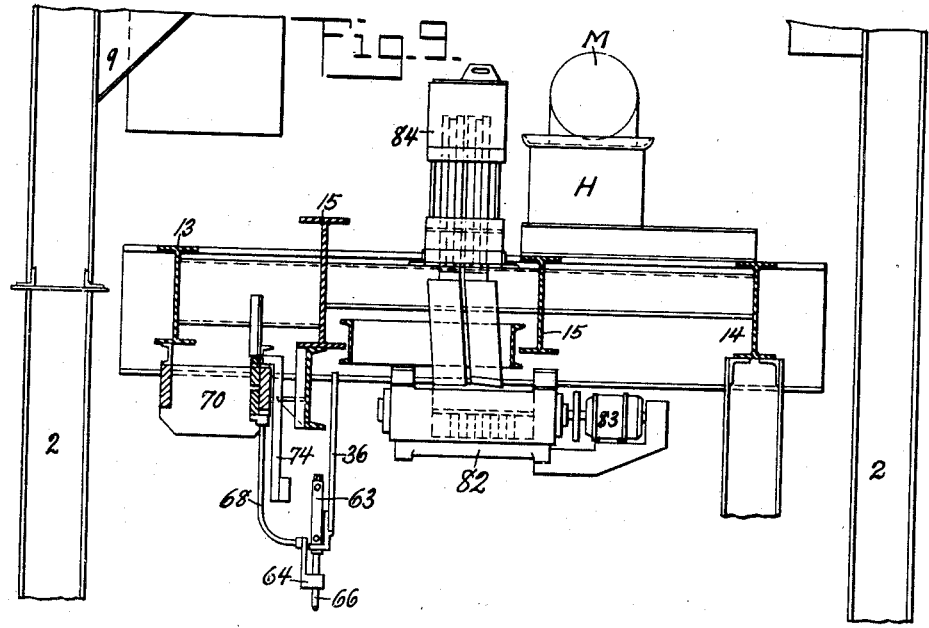
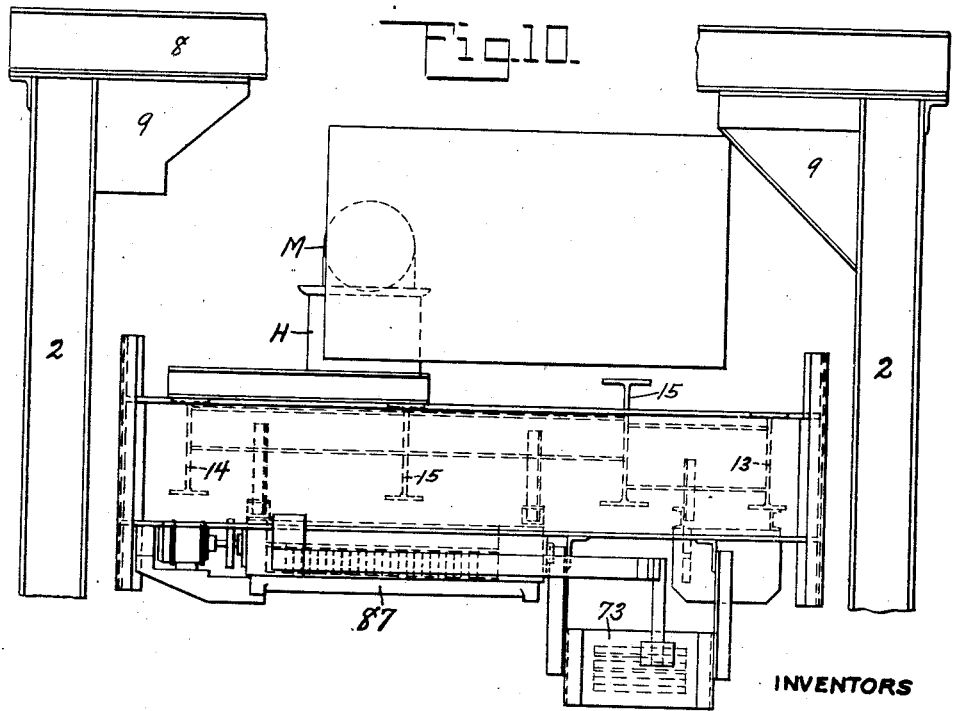

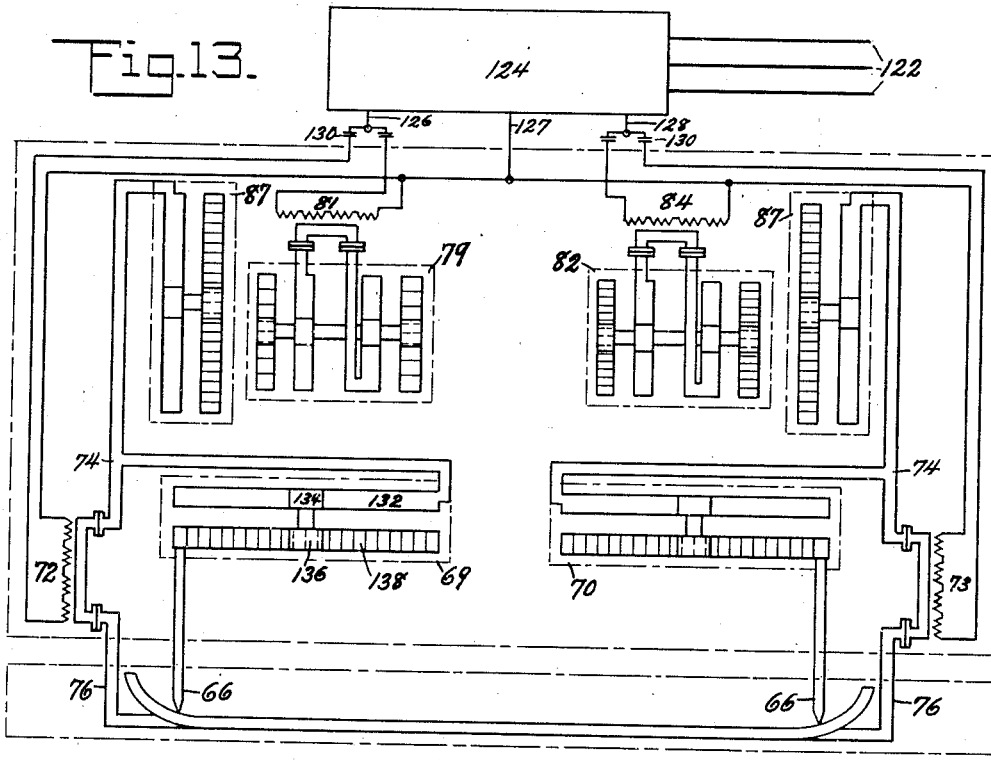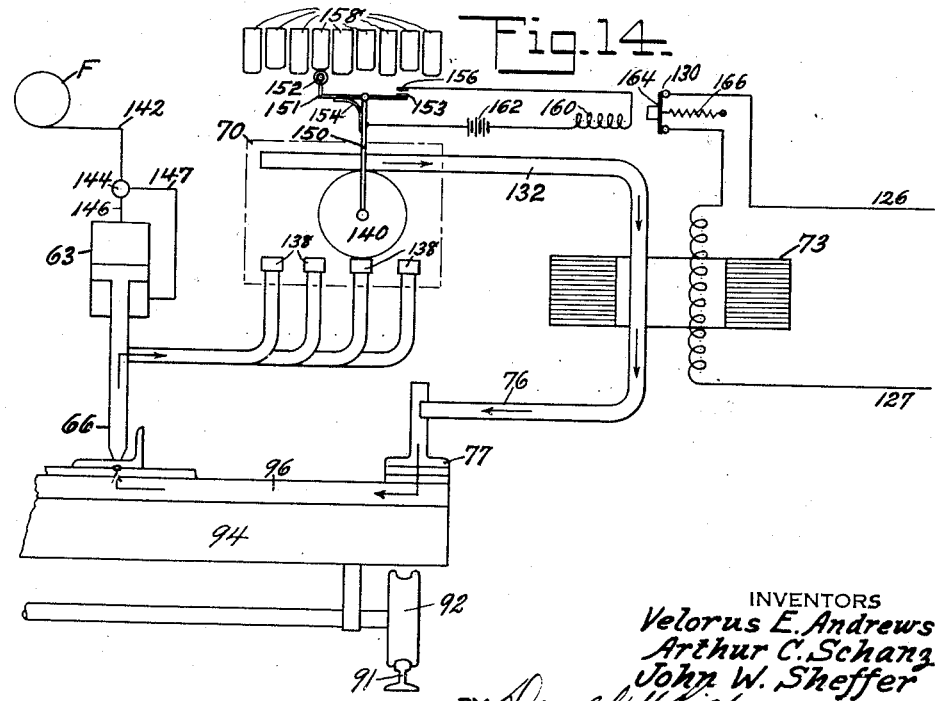

Patented June 16, 1942

2,286,945

UNITED STATES PATENT OFFICE 2,286,945

WELDING MACHINE

Velorus E. Andrews, Teaneck, and Arthur C. Schanz and John W. Sheffer, Glen Ridge, N. J., assignors to American Car and Foundry Company, New York, N. Y., a corporation of New Jersey Application March 4, 1941, Serial No. 381,740

12 Claims. (Cl. 219—4)

This invention relates to welding machines in general and in particular to a stationary machine for spot welding extremely large and heavy articles.

In the past extremely large articles such as railway car sides, roofs, etc., have been welded either by single electrode machines carried on a crane and moved from place to place along the work which was clamped to a jig, or with certain other welding machines the material was clamped to a jig in a substantially vertical position and the welding machine traveled along tracks permitting movement of the electrodes along the material to be welded. With all these machines the fact that the machine traveled relative to the work prohibited the application of pressure to a large number of electrodes at a time, for to apply pressure to a large number of electrodes would distort the material or tilt the machine on its supporting track. The fact that only a few electrodes could be engaged with the material at a time resulted in the machine being comparatively slow in action, thus requiring an excessive amount of time to complete the welding of a large article such as a car side or roof, which in the case of passenger vehicles are in the neighborhood of 80 ft. in length and 8 ft. wide. It is an object, therefore, of the present invention to provide a stationary spot welding machine of an extremely rigid construction and with the parts so arranged as to permit the carrying of the work or material to be welded through the machine.

A further object of the invention is the provision of a welding machine for welding large articles and which machine is constructed with a large number of electrodes simultaneously engageable with the material to be welded.

A still further object of the invention is the provision of a welding machine having a large number of electrodes simultaneously engaging the material to be welded and supplied successively with welding current.

Another object of the invention is the provision of a welding machine having a plurality of electrodes engageable with the material to be welded in order to clamp the material upon a supporting structure or jig car together with control means which will successively supply welding current to the electrodes.

Still another object of the invention is the provision of a welding machine having a plurality of electrodes movable simultaneously toward the material to be welded and movable under individual control into pressure contact with the material together with means for shifting certain groups of electrodes along the material without necessitating a lift of the entire group of electrodes.

Yet another object of the invention is the provision of a multiple electrode spot welding machine in which the material is moved through the machine and in which the electrodes may engage a plurality of portions of the material without necessitating a movement of the entire electrode and without a movement of the material relative to the machine.

These and other objects of the machine will be apparent to persons skilled in the art from a study of the following description and accompanying drawings, in which:

Figure 1 is a plan view of the machine with parts in section to better disclose the construction of the machine;

Fig. 2 is a sectional view taken on line 2—2 of Figure 1 and looking in the direction of the arrows and showing a transverse row or group of electrodes;

Fig. 3 is a sectional view taken on line 3—3 of Figure 1 and showing the arrangement of the various electrodes and electrode groups;

Fig. 4 is a sectional view taken substantially on line 4—4 of Fig. 1 and showing the electrode arrangement immediately back of the main transverse row or group of electrodes;

Fig. 5 is a sectional view taken substantially on line 5—5 of Fig. 1 and showing the quadrant or swinging electrode arrangement;

Fig. 6 is an enlarged sectional view showing the manner of mounting the electrode groups for movement across the material to be welded;

Fig. 7 is a partial front view of the machine shown in Fig. 1;

Fig. 8 is a sectional view similar to Fig. 4 but showing a slightly modified form of machine with the electrode groups arranged to weld flat work such as a railway car side wall;

Fig. 9 is a sectional view similar to Fig. 3 but showing the transformer and distributor switch locations;

Fig. 10 is a side view of the machine showing the distributor switch location for certain of the longitudinally extending electrode groups;

Fig. 11 is a sectional view similar to Fig. 2 but showing a slightly modified form of the machine, such modification being necessary where it is desired to weld a roof from the thin sheathing toward the heavy framing;

Fig. 12 is a sectional view similar to Fig. 6 but showing an improved form of electrode group mount as used on the modification shown by Fig. 11;

Fig. 13 is a simplified wiring diagram showing the connections of the various transformers and distributing switches, and Fig. 14 is an elemental wiring diagram showing the connections of a single transformer and group of electrodes together with the necessary controls.

Referring now to the drawings in detail, it will be seen that in all cases the machine frame is similar and consists of four upright I-beam columns 2 supported upon a base, such as the shop floor 4. These columns are rigidly tied together at their upper ends by substantially box section front and rear beams 6 and 7 respectively and by side beams 8 also of box section. The upper cross beams are gusseted to the columns as at 9 and are tied together intermediate their ends by cross I-beams 10 which, together with other bracing, will effectively prevent any weaving or distortion of the machine frame under load.

Mounted within the frame for vertical reciprocation is a heavy framework or platen which, as clearly shown in the various views, is formed of side I-beams 12 joined together by front and rear I-beams 13 and 14 respectively, as well as by intermediate I-beams 15. These various I-beams are tied together by means of short channel or other form beams 16 so located as to accommodate the equipment later to be described and to effectively brace the main platen frame beams and prevent any possibility of their distortion. Extending vertically across the ends of side beams 12 are channels 17, best shown in Fig. 1, and to these channels are welded or otherwise secured V-shape guides 18 adapted to slide in guideways 20 welded or otherwise secured to the columns of the supporting framework; thus it will be seen that an openwork platen of extremely rigid construction has been provided, which platen may slide vertically relative to the columns of the machine. The platen is supported in the machine for reciprocatory motion by means of toggle linkages 21 and 22 located at either side of the machine and with the upper ends of the linkage pin connected to the machine frame and at the other end to the platen. The intermediate points of the toggle linkages are connected together at each side of the machine by connecting rod or tie 23. As clearly shown in Fig. 3, one of the links forming toggle linkage 22 is formed as a bellcrank having a projecting end 24 adapted to be pin connected to a piston rod 26 of a cylinder 27 trunnioned on the machine frame. Application of fluid pressure to the cylinders 27 will cause piston rod 26 to be raised, thus bending the toggle linkages at the center and causing a raising of the platen. With the platen in the fully lowered position, as shown in Fig. 3, it will be seen that any upward thrust imparted to the platen will be transmitted through the aligned links and into the machine frame and thence to the supporting bed or floor of the shop.

The vertically reciprocable platen is intended to carry as much of the welding equipment as possible in order to give it weight and bring the equipment as close as possible to the welding electrodes to prevent current losses in the low voltage conductors. As clearly shown in the drawings, Figs. 1 to 7 inclusive, the platen carries a plurality of electrode tips arranged in groups extending transversely and longitudinally of the material which will be moved through the machine for welding. As shown in these figures, the electrodes are arranged in a main transverse group 28, best shown in Figs. 2 and 3, and in substantially four vertically directed longitudinally arranged groups 29, 30, 31 and 32, best shown in Figs. 3 and 4. In addition to these electrodes the machine includes horizontally directed longitudinally disposed groups 33, best shown in Figs. 1, 3 and 4, as well as swinging electrode groups 34, best shown in Figs. 3 and 5. The main transversely extending group of electrodes 28 are mounted upon the lower edge of a non-magnetic plate 36 which carries at its upper edge a slide plate 37 fastened thereto by bolts or other means as clearly shown in Fig. 6. The slide plate 37 is adapted to move transversely of the machine platen in slideways 38 fastened to a channel beam 39 which is in turn rigidly secured to the I-beam 15 of the platen. In order to shift the slide plate 37 and thereby the entire electrode group a plate 40 is connected to the slide plate and extends through a slot 41 in channel beam 39. This plate 40 has pin connected thereto at its outer end a piston rod 42 working in a cylinder 43; thus by applying fluid pressure to cylinder 43 the slide 37, non-magnetic plate 36 and the entire group of electrodes attached thereto may be slid along the material to be welded. A similar arrangement is provided for causing movement of the electrode groups 29, 30, 31 and 32 in the plane of the electrodes. In these cases, however, as clearly shown in Fig. 4, the non-magnetic electrode carrying plates 44 are connected to a slideway 46 adapted to engage over a slide plate welded or otherwise secured to the lower edges of platen carried beams 47. The slideways 46 have connected thereto a piston 48 adapted to work in a cylinder 59 fastened upon the platen beam 47 (see Fig. 3). It is to be understood of course, that each of the electrode groups 29, 30, 31 and 32 is similarly mounted and similarly controlled by pistons which are indicated in Fig. 4 at 51, 52 and 53. In order to take care of necessary camber in the parts to be welded the electrode groups 29, 30, 31 and 32 are mounted on a framework 45 (Figs. 3, 6) slidable in guides 45A carried by beams 15 and actuated by means of a suitable power device such as screw 50A (Figs. 1 and 4). Actuation of the screw will cause sliding of the framework and the four attached electrode groups bodily across the parts to be welded and in a plane transverse to the plane of the electrodes. Thus each of the longitudinally extending groups of electrodes may be shifted along the material in the plane of the electrodes by supplying fluid pressure to any one or to all of the cylinders 51, 52 and 53, while the entire assembly of four groups may be shifted across the material in a direction transverse to the plane of the electrodes by actuation of screw 50A. The horizontally directed longitudinally extending groups of electrodes 33 are also mounted for sliding movement upon a platen carried structure 54, such sliding being accomplished by supplying fluid pressure to cylinders 56 (Fig. 3). As clearly shown in Fig. 5, the swinging electrodes 34 are mounted upon plate 57 swinging around axis 58 carried by a bracing structure attached to the platen and with the plate 57 being swung through operation of worms 59 connected to and rotated by a shaft 60 and handle 61. The electrodes in the case of the swinging electrode carriers are slid along the supporting plate by means of fluid actuated cylinders 62; thus by rotation of shaft 60 the electrodes may be moved across the work, while energization of cylinder 62 will cause the electrodes to be moved toward the work or material to be welded.

All of the electrodes of each of the various groups just described are preferably fluid actuated and consist of fluid pressure cylinders 63 mounted upon the plate which is to be slid relative to the platen and having the piston connected to a slidable carrier 64 adapted to have screwed therein removable electrode tips 66. These various electrode actuating cylinders 63 of the various groups are all connected through piping and suitable valves to a source of pressure such as a pump F (Fig. 5) driven by a motor M all resting upon a sump H carried by the platen and movable therewith. It is, of course, impossible to show all piping, valve connections, etc., to each of the electrode actuating cylinders, for to do so would unnecessarily confuse the drawings, but it is believed that the operation will be readily understood by referring to Fig. 14 later to be described. It may be desirable in some instances to have certain of the electrodes in the various groups spring mounted on the carrying plate and such a mounting is possible for it will, like the fluid mounting described, permit of substantial equalization of pressure on the electrode tips but, of course, will prohibit positive control of the movement of such spring mounted electrodes.

As clearly shown, all of the electrodes carried by the platen may be engaged with the material or by preventing flow of fluid to the electrode cylinders certain electrodes or groups of electrodes may be prevented from contacting the material. However, in most cases all or substantially all of the electrodes will be in engagement with the material to be welded. In order to reduce the peak loads on the power lines supplying the machine, the electrodes of the various groups are fired or fed current successively by control means later to be described. As indicated in Fig. 3, each of the electrode holders 64 is supplied current through flexible conductor 68 connected to the holder and to a segment in a distributor switch. Due to the large number of electrode tips in the main transverse group 28 two distributor switches 69 and 70 (Fig. 1) are provided and these distributor switches are the type having a roller carried therein and driven across the segments by means of a motor 71. Current to the distributor switch 69 is supplied by transformer 72 of the variable voltage type, while current to distributor switch 70 is supplied from variable voltage transformer 73 (Figs. 1 and 7). The current is led from one leg of the transformer secondary to the distributor switches by buss bars 74 (Fig. 7), while the other leg of the secondary is connected by flexible conductor 76 (Fig. 2) to a presser foot 77 spring mounted upon the lower end of a strut 78 carried by the platen. The electrode groups 29 and 30 are connected, as clearly shown in Fig. 4, to segments of distributor switch 79, more clearly shown in Fig. 1, and having its moving contact roller driven by motor 80. Current is supplied to this distributor switch by transformer 81. Electrode groups 31 and 32 are similarly connected to distributor switch 82 driven by motor 83 and with the switch supplied with current by transformer 84. The electrodes of electrode groups 33 are connected by means of flexible connectors 86 to a distributor switch 87 located at each side of the machine adjacent the electrodes and supplied with current from the adjacent transformer 72 or 73; it, of course, being understood that the circuits are so arranged that distributor switches 87 are not in operation when distributor switches 69 and 70 are in operation, thereby preventing over-load of transformers 72 and 73. As clearly shown in Fig. 5, the swinging electrode groups 34 are connected by flexible connectors 88 to a distributor switch 89 supplied with current from a transformer 90.

From the preceding description of the arrangement of various parts it will be seen that the vertically reciprocable openwork platen carries thereon a plurality of electrodes arranged in groups extending transversely and longitudinally of the material to be welded as the material moves through the machine. These electrodes move simultaneously toward and away from the material during reciprocation of the platen, while each electrode tip can be projected or moved toward the material by supplying fluid under pressure to the electrode cylinders 63. Each of the electrode groups, after the electrodes have been forced into contact with the material, are supplied welding current from a separate transformer through a separate distributor switch and in most cases it is not necessary that the various distributor switches work together; thus the various transverse and longitudinally extending groups of electrodes may be simultaneously lowered into pressure contact with the material to be welded thereby completing the circuit for successively fed welds yet without overloading the lines feeding the machine.

In order to support the material to be welded and move it through the machine, rails 91 (Fig. 2) are arranged in the floor of the shop and adapted to support thereon wheels 92 carrying an exceedingly strong jig car frame 93, upon which is mounted a heavy wood supporting structure 94 covered by a copper plate 96. This copper plate carries adjacent its side edges bars 97 adapted to be contacted by presser feet 77, thus connecting the copper surface of the jig car to the transformers 72 and 73. If a car side is being welded it is, of course, obvious it may be supported directly on the flat top of the jig car, but in cases where the work is curved, such as in a car roof, an additional jig frame 98 must be mounted upon the jig car in order to provide a rigid conducting back to support the roof during welding. In all cases the material to be welded, whether it be a roof, side or other structure, has been indicated in the drawings by W. It is, of course, obvious that the roof supporting portion of the jig may be readily removed from the jig car to permit welding of car sides or to permit changing of jigs to allow welding of roofs of widely differing curvature.

As clearly shown in Fig. 8 the machine may be readily transformed for use in welding of car sides or other flat structures by merely directing the electrode groups 29a, 30a, 31a and 32a vertically which will permit of a slightly better distribution of current feeding to the electrodes. In this form the electrode group 29a will be fed through a distributor switch 101, while electrode groups 30a and 31a will be fed through distributor switch 102 located substantially at the central portion of the platen and supplied with current from a transformer 103. Electrode group 32a will be fed from distributor switch 104 supplied with current from a transformer, not shown.

Referring now to the form shown in Figs. 11 and 12, it will be seen that the main transversely arranged group of electrodes 106 are so arranged as to act on a car roof having the thin sheets upwardly and the heavy framing located beneath and supported by the jig car structure, but insofar as the feeding of current to the electrodes in succession, it is accomplished identically in the same manner as that previously described and also the transverse shifting of the electrodes across the material and in the plane of the electrodes is accomplished by actuation of a cylinder, not shown, but of the same type as cylinder 43 referred to in connection with Fig. 2. Current to the electrode tips is fed in succession from distributor switch 108 driven by motor 109 in exactly the same manner as previously described. The presser foot 110 is connected to one terminal of transformer 111, while the other terminal is connected by buss bar 112 to the distributing switch. In this modification the presser foot 110 is urged into contact with the jig car by means of a hydraulic cylinder 114. As clearly shown in Fig. 12, any eccentric loading of the electrode carrier is eliminated by mounting the electrodes as shown; in other words, with the electrode cylinders located between and clamped to arms 116 of a slide 117. This slide is adapted to move in guides 118 welded or otherwise secured to an I-beam 120 rigid with the platen structure. From a study of this structure it will be seen that the electrode tip is in direct alignment with the web of the I-beam, thereby preventing any eccentric loading which might distort the structure supporting the electrodes on the platen. It will, of course, be obvious that this electrode mounting to overcome eccentric loading may be substituted for the type of mounting shown on the machines described in connection with Figs. 1 to 10 inclusive.

In any case and regardless of the type of slide mount for the electrodes, it will be seen that the transversely and longitudinally extending groups of electrodes may be moved independently of each other across the material to be welded and independent of any platen movement since they may be brought out of pressure contact with the material by actuation of electrode cylinders 63. In this manner certain of the electrode groups may be used to always hold the work firmly on the jig car, while other groups are shifted to bring new areas of work beneath the electrodes for welding. In the machines as constructed each of the groups is capable of three shift positions, thus in effect tripling the number of spots possible with a given number of electrodes and without a shifting of the material in the machine with possible shift of the component parts of the material. Also in the machines as constructed the platen lift cylinders 27 are so controlled that a small platen lift may be obtained, for example, a lift of two or three inches, which will simultaneously clear all electrode tips of pressure contact with the materials to be welded, permitting a shift of any one or all of the group of electrodes across the material. Such a lift of the platen will not consume much time and may speed up the welding operation since it may be accomplished more readily than can the individual lift of the electrodes through operation of electrode cylinders 63.

Referring now to Figs. 13 and 14 disclosing simplified wiring diagrams for the machines and particularly the machine of Figs. 1 to 7 inclusive, it will be seen that wherever possible the same reference numerals have been applied to indicate the equipment as was previously used in the description of the machine. The electrical power for the machine is fed thereto through conductors 122 connected to any suitable source of power and to a control box 124 which contains the necessary switches, breakers and welding time control mechanism. From this control box conductors 126, 127 and 128 lead to the various transformers of the welding machine. Conductor 126 is branched and in each branch is placed a switch 130, preferably of the magnetic type, for controlling the flow of current. One of the branch conductors of wire 126 is connected to the primary of transformer 72, while the other branch is connected to the primary of transformer 81, which transformers supply low voltage current to distributor switches 69 or 87 and 79 respectively. Conductor 128 is likewise branched and provided with magnetic switches 130 in each branch, with one branch connected to the primary of transformer 73 and the other branch to the primary of transformer 84. One terminal of the primary of each transformer is connected to the conductor 127, as clearly shown in Fig. 13. As clearly shown, transformer 73 supplies low voltage welding current to distributor switches 78 and 87, while transformer 84 supplies low voltage welding current to distributor switch 82. As indicated in Fig. 13, each of the distributor switches contains a solid conductor bar 132 connected directly to the secondary of the respective transformer and is engaged by a roller 134 electrically connected to a second roller 136 which rolls over a strip made up of a plurality of insulated segments 138. Each electrode tip 66 is connected to a segment 138 and thus cannot be supplied with current until rollers 134 and 136 are in position to permit passage of current through the electrode tip. In practice it may be found more convenient for the distributor switch rollers to be replaced by a single roller 140 indicated in Fig. 14, in which figure a simplified circuit has been disclosed using distributor switch 70 and transformer 73 for purposes of representation. Also in this figure wherever possible the same reference characters have been used which were used in connection with Figures 1 to 7 inclusive and Figure 13. As clearly shown by Fig. 14 fluid under pressure from pump F may be supplied through pipe or tubing 142 to a control valve 144, preferably of the three-way type, which is in turn connected by pipes 146 and 147 to the upper and lower ends of electrode cylinders 63; thus upon actuation of valve 144 the electrode tips 66 may be raised or lowered/ it being understood that as many of the electrode tips as desired are equipped with valves and connections to permit operation of the electrode tips individually or in unison in any preselected arrangement. The roller 140, which is driven by a motor or other means, has connected thereto an arm 150 to which is pivoted a cross arm 151 carrying at one end a small roller 152 and at the other end a contact 153. The roller 152 is constantly urged in a clockwise direction by spring 154, thus tending to move contact 153 away from its mating contact 156. Arranged in the distributor switch box is a plurality of segments 158 which are loose segments held in position by clamping arrangements, not shown, thereby permitting a longitudinal sliding of the segments to obtain various settings. As shown in Fig. 14, the segments are adjusted to give alternate long and short projections toward the roller 152, thus arm 150 in moving along the segment bar in unison with roller 140 will be rocked about its pivot due to roller 152 following the segments and will accordingly make or break contacts 153, 156. The short projecting segments are so placed that when as shown in Fig. 14 roller 152 is bearing on a short segment roller 140 will be in contact with a segment 138, thus completing the circuit of the transformer secondary. In order to control switches 130 contact 156 is connected to a coil 160 which is also connected to a battery or other source of power 162 having the other terminal connected to the arm 150 or, in other words, to contact 153. When contacts 153 and 156 are together current from the battery or other source of power will flow through coil 160 thereby pulling contactor 164 toward it against the tension of a spring 166. When, however, contact 153 moves away from contact 156 the control circuit will be broken and coil 160 de-energized permitting the spring 166 to pull contactor 164 into closed position, thereby energizing the primary of transformer 73. Energization of transformer 73 will cause a current to be induced in the secondary and this current will flow in conductor 76, presser foot 77, into the jig car and through the work or material into electrode 66, thence into segment 138 through roller 140 to bar 132 and back to the transformer. When roller 140 in its power driven movement over segments 138 bridges a gap between segments the roller 152 will be in contact with a long projecting bar or segment 158 and contacts 153 and 156 are closed and the contactor 164 is pulled away leaving the transformer 73 de-energized. It will thus be seen that when the platen is raised presser foot 77 is out of contact with the jig car and even though electrodes 66 are pressed into contact with the work by operation of cylinders 63, no current can flow into the material. Likewise, even if the platen is down and certain cylinders 63 are in a lifted position with the electrodes 66 out of contact, still no current can flow to the work or material. Also if segments 158 are projected an equal long distance, then the roller 152 will ride on a substantially even path and coil 160 will not be de-energized and current cannot flow. In other words, an operator may preselect the electrodes which will receive current or be fired by use of valves 144 or by an adjustment of segments 158 in the distributor switch. Normally, the selection will be made by valves 144 since such a selection is much more readily made than moving of the segments 158 in the distributor switch. It will be seen that the segments 158, together with the associated mechanism and control circuit, comprise a control means for energizing an electrode only when such electrode is connected to the secondary or, in other words, when the switch means or roller 140 is in a position to pass current to an electrode. It will, of course, be obvious also that movement of roller 140 across the insulated segments 138 will connect the electrodes in succession to the transformer secondary and that a weld will be made provided the electrode is in pressure contact with the material and segments 158 are properly adjusted.

It is believed that from the preceding description the operation of the machine may be readily understood, however, the following résumé of machine operation may be found helpful. In practice the car side, roof or other material to be welded is clamped upon the jig car which is then intermittently moved through the machine with the amount of movement being adjusted in accordance with the placement of the component parts of the material to be welded. After the material is in position under the platen of the machine, the platen is lowered toward the jig car with the presser foot coming into contact with the jig car thereby completing one leg of the transformer connections from transformers 72 and 73. With the platen lowered and the various groups of electrodes in their proper position relative to the material, the electrodes are lowered or forced into pressure contact with the material by energization of electrode cylinders 63. As was previously stated, however, certain of the electrodes may be held out of contact with the work by not energizing their respective cylinders, such holding out of contact being necessitated by position of component parts of the material to be welded. The application of the fluid pressure to the electrodes to force them into pressure contact with the material will cause an equalization to take place insuring an equal pressure on all the electrode tips, provided, of course, that the cylinders 63 are of identical size. With the preselected electrodes in pressure contact with the material the various distributor switch motors or driving devices are energized thus causing the rollers 140 to travel across the segments 138 successively placing the electrodes in current conducting relation with the respective transformer secondary, which transformer will be energized by the control circuit in accordance with the placement of segments 158; thus any preselected number of electrodes in any preselected group will be energized in succession for completing the desired welds in the material. After the first setting of welds has been completed the platen may be raised a slight amount bringing the electrode tips out of pressure contact with the material and without touching valves 144. With the platen in partially raised position fluid pressure may be fed to the various shift cylinders, such as 43, to cause shifting of the groups of electrodes across the material to be welded and in the plane of the electrodes, whether these electrodes be arranged transversely or longitudinally of the material. With the electrodes in the new shifted position a lowering of the platen will immediately bring the desired electrodes into contact with the material and the welds may be completed in the new position by energizing the motors or other driving devices for the distributor switches. In certain cases it may be found desirable to retain certain of the electrode groups in pressure contact with the material to prevent a shifting thereof while permitting other welds to be made by certain of the electrode groups. In such an operation after completion of the first set of welds the platen is not raised but only certain groups of the electrodes are raised by actuation of valves 144, after which these groups may be shifted to a new position and brought into pressure contact with the work for completion of another set of welds by the shifted electrodes; also the platen may be left in lowered position and all electrodes brought out of pressure contact with the material and shifted for the completion of a new set of welds, but such an operation is slightly slower than that accomplished by a lift of the platen itself followed by a shift of the electrode groups. After all the desired welds have been made upon the material in one position, the platen will be fully raised and the jig car with the material carried thereby will be moved to a new position and the operation repeated. The machine as described is extremely flexible permitting an operator to place the welds in substantially any order through selection of individual electrodes or selection of groups or by a shifting of the groups across the material without moving the material relative to the machine proper. In certain classes of work where the component parts of the material repeat a definite pattern the machine may be made fully automatic carrying out the various raising and lowering operations of the platen and shifts of electrode groups and even the preselection of electrodes to be brought into pressure contact with the material.

Although the machine has been described more or less in detail, it will be obvious that various modifications and rearrangements of parts will be possible without in any way departing from the scope of the invention as defined by the appended claims covering what we consider to be new.

What is claimed is:

1. In a welding machine the combination of supporting means for intermittently moving through the machine material to be welded at a plurality of points spaced longitudinally and transversely of the path of movement of the material, a plurality of individual welding electrodes movable toward and away from the material and arranged in groups extending longitudinally and transversely of the path of movement of the material, means for independently moving each group of electrodes along the material and in the plane of the electrodes, switch means associated with each group for distributing welding current in succession to the individual electrodes of the associated group, and control means for supplying welding current to said switch means only when in proper current distributing position.

2. In a welding machine the combination of supporting means for intermittently moving through the machine material to be welded at a plurality of points spaced longitudinally and transversely of the path of movement of the material, a plurality of individual welding electrodes carried by the machine and arranged in groups extending longitudinally and transversely of the path of movement of the material, power means to move said electrodes toward and away from the material, additional power means for independently moving each group of electrodes along the material in the plane of the electrodes, switch means associated with each group for distributing welding current in succession to the individual electrodes of the associated group, and control means for supplying welding current to said switch means only when in proper current distributing position.

3. In a welding machine the combination of supporting means for intermittently moving through the machine material to be welded at a plurality of points spaced longitudinally and transversely of the path of movement of the material, a plurality of welding electrodes carried by the machine and arranged in groups extending longitudinally and transversely of the path of movement of the material, power means to simultaneously move said groups of electrodes toward and away from the material to be welded, additional power means to selectively move each group of electrodes along the material in the plane of the electrodes, fluid pressure means to individually and selectively force said electrodes into contact with the material to be welded and switch means for distributing and controlling the flow of welding current successively to the electrodes.

4. In a welding machine the combination of a jig car for moving through the machine substantially in a horizontal plane material to be welded, a vertically movable platen carried by the machine, a transformer carried by the platen and having one secondary terminal contacting the jig car to carry current thereto upon lowering of the platen, a plurality of electrodes carried by the platen and movable therewith, means to individually force substantially all said electrodes into current carrying contact with the material to be welded and squeeze the same against the jig car to firmly hold the material for welding, switch means to successively connect the electrodes to the other secondary terminal to successively complete the welding circuit, and control means automatically energizing said secondary only when said switch means is in position connecting an electrode to the secondary.

5. In a welding machine the combination of a jig car for moving through the machine material to be welded, a vertically movable platen carried by the machine, a transformer carried by the platen and having one secondary terminal contacting the jig car to carry current thereto upon lowering of the platen, a plurality of electrodes carried by the platen and movable therewith into pressure contact with the material to be welded, means to equalize the pressure of the various electrodes upon the material to be welded, means to shift the electrodes along the material relative to the platen when said electrodes are free of pressure contact with the material, and switching means to successively connect the electrodes to the other secondary terminal and energize the secondary to pass welding current into the material.

6. In a welding machine the combination of a jig car for moving through the machine material to be welded, a vertically movable platen carried by the machine, a transformer carried by the platen and having one secondary terminal contacting the jig car to carry current thereto upon lowering of the platen, a plurality of electrodes carried by the platen and movable therewith into pressure contact with the material to be welded, said electrodes being arranged in groups extending longitudinally and transversely of the path of movement of the material, means to individually shift the groups of electrodes across the material and relative to the platen when free of pressure contact with the material, switch means to successively connect the individual electrodes in each group to the other secondary terminal, and control means connected to said switch means to automatically energize said secondary when said switch means is in position connecting an electrode to the secondary.

7. In a welding machine the combination of a support car for moving through the machine substantially in a horizontal plane material to be welded, a vertically reciprocable platen forming part of the machine, a plurality of transformers carried by the platen, a plurality of electrodes carried by the platen and vertically movable therewith, means to move said electrodes vertically toward the material independently of the lowered platen, said means equalizing the pressure on the electrodes whereby all the electrodes will bear on the material resting on the support car with equal unit pressures to firmly hold the material for welding, and means for individually and successively connecting said electrodes to preselected transformers for flow of welding current to the material.

8. In a welding machine the combination of a support car for moving through the machine material to be welded, a vertically reciprocable platen forming part of the machine, a plurality of transformers carried by the platen, a plurality of electrodes carried by the platen and vertically movable therewith and being arranged in independent groups, means to move preselected electrodes into contact with the material and independently of the platen when lowered, means to shift selected groups of electrodes across the material and relative to the platen, and control means for individually and successively connecting the preselected electrodes of each group to a preselected transformer for flow of welding current to the material.

9. In a welding machine the combination of a support for material to be welded, a vertically reciprocable platen forming part of the machine, a transformer carried by the platen, a plurality of electrodes carried by the platen and movable therewith, means to move any preselected number of electrodes into and out of pressure contact with the material to be welded and independent of any movement of the lowered platen, means to shift preselected electrodes as groups across the material independent of the position of the remaining electrodes when the electrodes to be shifted are out of pressure contact with the material, said shifting of electrode groups permitting a greater number of welds to be made than there are electrodes and without shifting the platen or material, and means connecting the electrodes to the transformer for supply of welding current to the material.

10. In a welding machine the combination of a support for material to be welded, a vertically reciprocable platen forming part of the machine, a plurality of transformers carried by the platen, a plurality of electrodes carried by the platen and movable therewith, means to move any preselected number of electrodes into and out of pressure contact with the material to be welded and independent of any movement of the lowered platen, means to shift preselected electrodes as groups across the material independent of the position of the remaining electrodes when the electrodes to be shifted are out of pressure contact with the material, said shifting of electrode groups permitting a greater number of welds to be made than there are electrodes and without shifting the platen or material, switch means associated with the electrode groups for automatically and successively connecting the electrodes of the associated group to a preselected transformer, and control means for independently energizing the transformers when said switch means has connected the associated transformer to an electrode.

11. In a welding machine the combination of supporting means for intermittently moving through the machine material to be welded at a plurality of points spaced longitudinally and transversely of the path of movement of the material, a plurality of welding electrodes movable toward and away from the material and arranged in groups extending longitudinally and transversely of the path of movement of the material, means for moving each group of electrodes along the material and in the plane of the electrodes, additional means for moving certain groups of electrodes across the material and transversely to the plane of the electrodes, switch means associated with each group for distributing welding current in succession to the electrodes of the associated group, and control means for supplying welding current to said switch means only when in proper current distributing position.

12. In a welding machine the combination of supporting means for intermittently moving through the machine material to be welded at a plurality of points spaced longitudinally and transversely of the path of movement of the material, a plurality of welding electrodes carried by the machine and arranged in groups extending longitudinally and transversely of the path of movement of the material, power means to simultaneously move said groups of electrodes toward and away from the material to be welded, additional power means to selectively move each group of electrodes along the material in the plane of the electrodes, additional power means to shift certain groups of electrodes bodily across the material and transverse to the plane of the electrodes, fluid pressure means to individually and selectively force said electrodes into contact with the material to be welded and switch means for distributing and controlling the flow of welding current successively to the electrodes.

VELORUS E. ANDREWS.
ARTHUR C. SCHANZ.
JOHN W. SHEFFER.